United States Patent
Robbins et al.

(10) Patent No.: US 9,890,877 B2
(45) Date of Patent: Feb. 13, 2018

(54) CORRUGATED METAL VENT PIPE AND ASSOCIATED SYSTEM AND METHOD

(71) Applicants: Greg L. Robbins, Pasco, WA (US);
Wayne Peterson, Camas, WA (US);
William L. Zepp, Sunbright, TN (US)

(72) Inventors: Greg L. Robbins, Pasco, WA (US);
Wayne Peterson, Camas, WA (US);
William L. Zepp, Sunbright, TN (US)

(73) Assignee: CONTECH ENGINEERED SOLUTIONS LLC, West Chester, OH (US)

( * ) Notice: Subject to any disclaimer, the term of this patent is extended or adjusted under 35 U.S.C. 154(b) by 168 days.

(21) Appl. No.: 14/830,126

(22) Filed: Aug. 19, 2015

(65) Prior Publication Data

US 2016/0050948 A1    Feb. 25, 2016

Related U.S. Application Data

(60) Provisional application No. 62/040,773, filed on Aug. 22, 2014.

(51) Int. Cl.
*F16L 9/06*  (2006.01)
*F16L 11/16* (2006.01)
*F16L 9/16*  (2006.01)
*F16L 9/00*  (2006.01)

(52) U.S. Cl.
CPC ............... *F16L 9/165* (2013.01); *F16L 9/006* (2013.01); *F16L 9/06* (2013.01)

(58) Field of Classification Search
CPC .......... F16L 9/06; F16L 9/165; B21C 37/157; B21C 37/124

USPC ........ 138/121, 122, 129, 173, 135, 144, 154
See application file for complete search history.

(56) References Cited

U.S. PATENT DOCUMENTS

| 3,183,695 | A | * | 5/1965  | Darner    | B21C 37/124 |
|           |   |   |         |           | 72/129      |
| 3,538,728 | A | * | 11/1970 | Massey    | B21C 37/12  |
|           |   |   |         |           | 72/13.6     |
| 3,621,884 | A | * | 11/1971 | Trihey    | B21C 37/121 |
|           |   |   |         |           | 138/144     |
| 3,753,363 | A | * | 8/1973  | Trihey    | B21C 37/121 |
|           |   |   |         |           | 72/140      |
| 3,753,367 | A | * | 8/1973  | Trihey    | B21C 37/121 |
|           |   |   |         |           | 72/49       |
| 3,857,159 | A | * | 12/1974 | Davis     | B21C 37/123 |
|           |   |   |         |           | 29/429      |
| 3,865,146 | A | * | 2/1975  | Meserole  | B21C 37/121 |
|           |   |   |         |           | 138/120     |
| 4,129,152 | A |   | 12/1978 | Davis     |             |
| 4,163,474 | A |   | 8/1979  | MacDonald et al. |      |
| 5,191,916 | A |   | 3/1993  | Kanao     |             |
| 5,538,294 | A | * | 7/1996  | Thomas    | F16L 11/14  |
|           |   |   |         |           | 138/128     |

(Continued)

*Primary Examiner* — Patrick F Brinson
(74) *Attorney, Agent, or Firm* — Thompson Hine L.L.P.

(57) ABSTRACT

A corrugated metal vent pipe includes a helically corrugated pipe structure formed by helical winding of a corrugated metal strip, wherein the helically corrugated pipe structure has a diameter of between 15 inches and 36 inches and a plurality of vent openings distributed thereon. A first pipe end treatment is located on a first end of the helically corrugated pipe structure, and a second pipe end treatment is located on a second end of the helically corrugated pipe structure.

14 Claims, 7 Drawing Sheets

(56) References Cited

U.S. PATENT DOCUMENTS

| | | | |
|---|---|---|---|
| 5,881,442 A * | 3/1999 | Hultberg | B21C 37/123 29/33 D |
| 5,980,670 A * | 11/1999 | Andre | F16L 21/005 138/109 |
| 6,062,270 A * | 5/2000 | Hultberg | B21C 37/123 138/122 |
| 6,361,248 B1 | 3/2002 | Maestro | |
| 6,453,710 B1 * | 9/2002 | Andresen | B21C 37/121 29/33 D |
| 8,007,201 B2 | 8/2011 | Currivan | |
| 8,640,765 B2 | 2/2014 | Jensen | |
| 2002/0139160 A1 * | 10/2002 | Price | B21C 37/121 72/49 |

\* cited by examiner

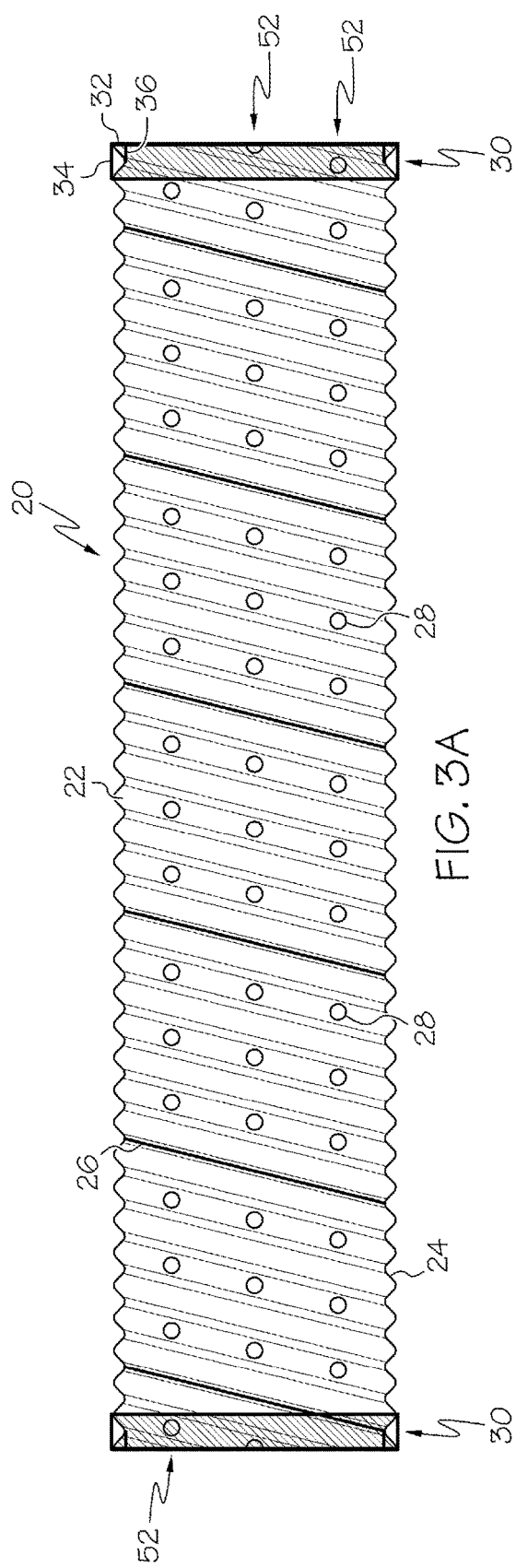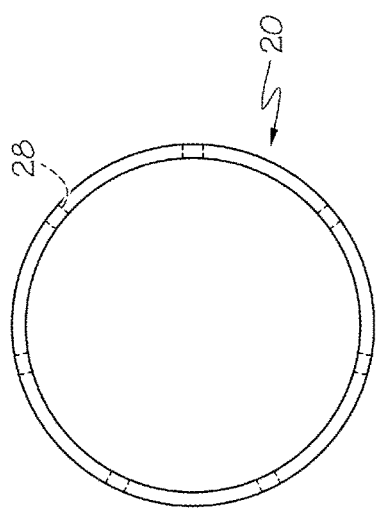
FIG. 3A
FIG. 3B

CORRUGATED METAL VENT PIPE AND ASSOCIATED SYSTEM AND METHOD

CROSS-REFERENCES

This application claims the benefit of U.S. Provisional Application Ser. No. 62/040,773, filed Aug. 22, 2014, which is incorporated herein by reference.

TECHNICAL FIELD

This application relates generally to corrugated metal pipe with openings that facilitate a venting feature of the pipe and, more specifically, to corrugated metal vent pipe for use in food handling and processing industry (e.g., such as mass storage and preservation of potatoes, sugar beets, onions or other similar food items).

BACKGROUND

As a general rule potatoes are harvested once a year. The potatoes are commonly stored in large quantities that require cooling and other processing in order to properly preserve the potatoes for an extended duration. Sugar beets, onions and other food products may be handled in a similar way to potatoes.

Referring to FIGS. 1 and 2, in one known prior art arrangement, potatoes 10 (or other food products) are stored atop a vented pipe system having one or more lengths of vent pipe 12. As seen in FIG. 2, the vent pipe 12 includes two sets of large (e.g., greater than about three inches in diameter), downward facing openings 14 along a lower portion of the vent pipe, with each of the openings 14 intersecting multiple corrugation crests and valleys. Cooling air and treatment agents (e.g., sprout inhibitors) are moved through the vent pipes and the openings 14 allow the air and agents to move into the potato mass for cooling or other treatment. The currently used corrugated metal pipe has a 2⅔"×½" configuration (i.e., 2⅔" from corrugation peak to corrugation peak, and ½" from corrugation peak to corrugation valley), may be formed of 12 or 14 gauge material and may have diameters ranging from 15 to 36 inches. The ends of the pipe, which typically contain sharp edges and burrs due to the end cuts used to produce the pipe lengths, are subjected to a grinding operation to remove such burrs.

The relatively low gauge material that is currently used results in a vent pipe that is relatively heavy and difficult to move, which makes the process of seasonally setting up the potato vent pipe systems, and later cleaning and storage of the pipes, labor intensive, and therefore costly. The grinding operation is also labor intensive and therefore increases the cost of the vent pipes. Moreover, in some cases the openings used do not provide desirable air flow to all areas of the potato mass (e.g., at the top of the pipe) and do not provide desirable distribution of the treatment agents. It would be advantageous to provide a vent pipe configuration and related system that addresses one or more of these problems.

SUMMARY

In one aspect, a corrugated metal vent pipe for use in the preservation and treatment of food products includes a helically corrugated pipe structure formed by helical winding of a corrugated metal strip, wherein the corrugated metal strip is 16 gauge or higher material and has a corrugation configuration with a corrugation depth between about 0.70 inches and about 0.75 inches and a corrugation pitch between about 1.50 inches and about 4.00 inches, and wherein the helically corrugated pipe structure has a diameter of between 15 inches and 36 inches, and a plurality of vent openings distributed thereon. A first pipe end treatment is located on a first end of the helically corrugated pipe structure. The first pipe end treatment includes a first end cap structure with a first annular end face, a first outer ring flange extending from the first annular end face lengthwise along and about a first exterior end portion of the helically corrugated pipe structure and a first inner ring flange extending from the first annular end face lengthwise along and within a first interior end portion of the helically corrugated pipe structure, wherein the first outer ring flange extends a length sufficient to cover burrs on the first exterior end portion of the pipe structure. A second pipe end treatment is located on a second end of the helically corrugated pipe structure. The second pipe end treatment includes a second end cap structure with a second annular end face, a second outer ring flange extending from the second annular end face lengthwise along and about a second exterior end portion of the helically corrugated pipe structure and a second inner ring flange extending from the second annular end face lengthwise along and within a second interior end portion of the helically corrugated pipe structure, wherein the second outer ring flange extends a length sufficient to cover burrs on the second exterior end portion of the pipe structure.

In another aspect, a corrugated metal vent pipe includes a helically corrugated pipe structure formed by helical winding of a corrugated metal strip, wherein the corrugated metal strip is 16 gauge or higher material, and wherein the helically corrugated pipe structure has a plurality of vent openings located thereon. A first pipe end treatment is located on a first end of the helically corrugated pipe structure, the first pipe end treatment formed by a first annular end cap structure with a first outer portion that extends from the first end lengthwise along and about a first exterior end portion of the helically corrugated pipe structure a length sufficient to cover burrs on the first exterior end portion of the pipe structure. A second pipe end treatment is located on a second end of the helically corrugated pipe structure, the second pipe end treatment formed by a second end cap structure with a second outer portion that extends from the second end lengthwise along and about a second exterior end portion of the helically corrugated pipe structure a length sufficient to cover burrs on the second exterior end portion of the pipe structure.

In another aspect, a corrugated metal vent pipe includes a helically corrugated pipe structure formed by helical winding of a corrugated metal strip, wherein the corrugated metal strip is 18 gauge or higher material and has a corrugation configuration with a corrugation depth between about 0.70 inches and about 0.75 inches and a corrugation pitch between about 1.50 inches and about 4.00 inches, and wherein the helically corrugated pipe structure has a diameter of between 15 inches and 36 inches and a plurality of vent openings distributed thereon.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 3A and 3B depict one embodiment of a corrugated metal vent pipe according to the present application;

DETAILED DESCRIPTION

Figure 1:
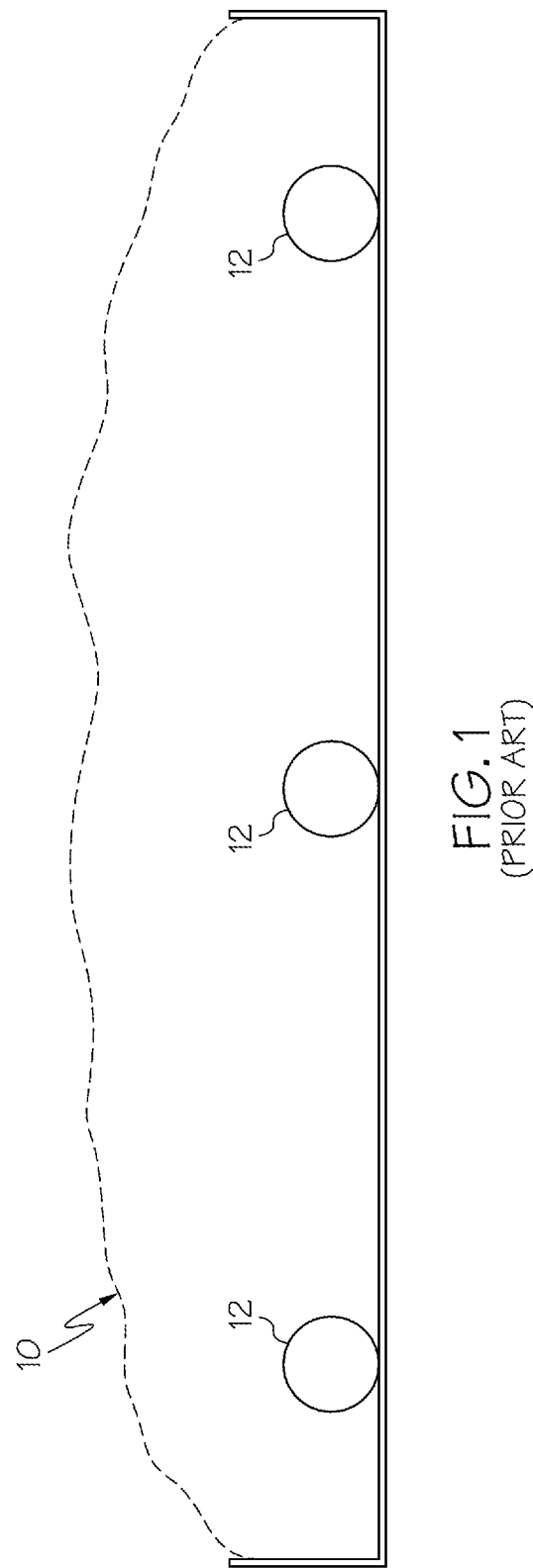
FIG. 1 schematic end elevation of a prior art potato preservation system.
Figure 2:
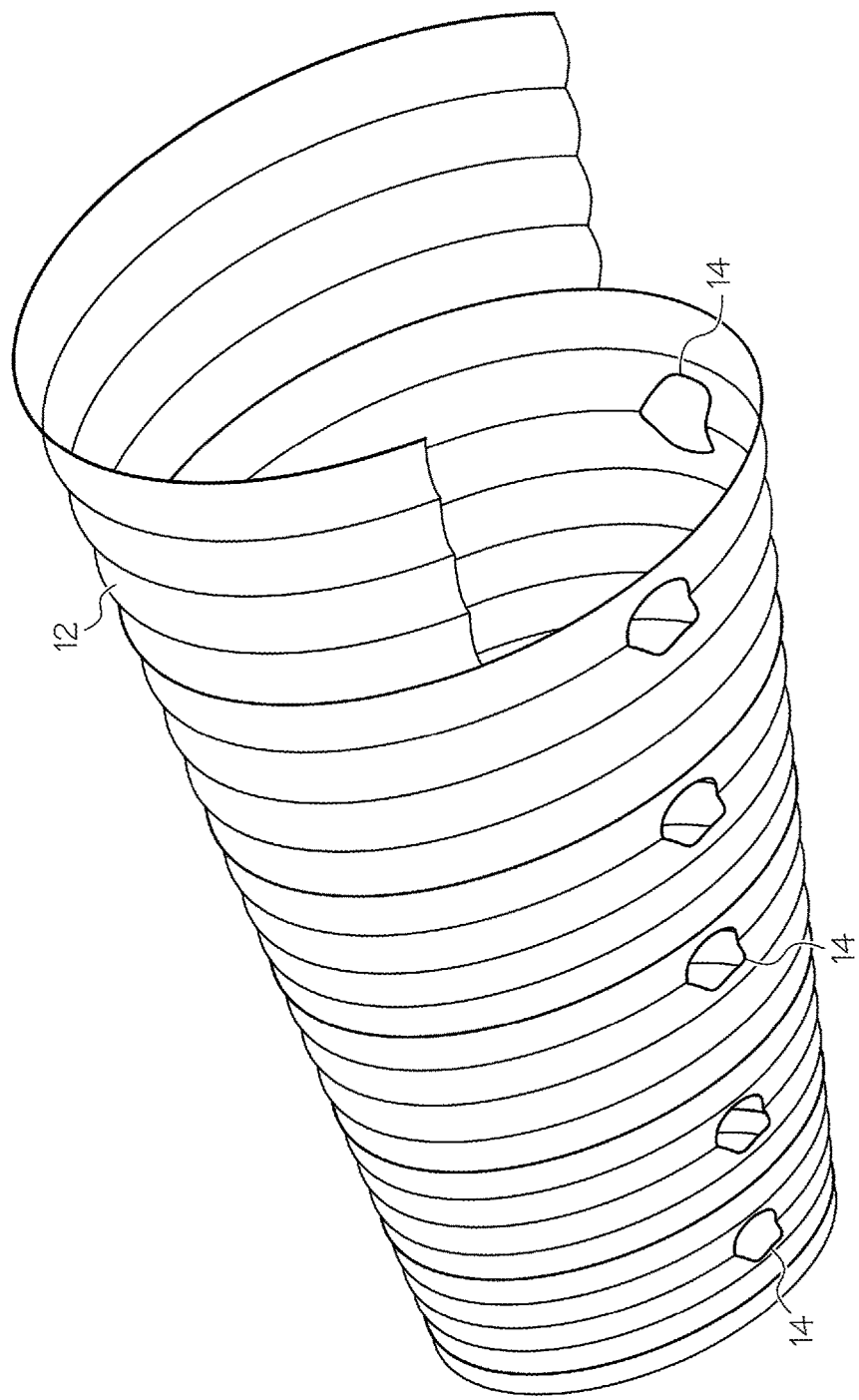
FIG. 2 is partial perspective view of a prior art corrugated metal vent pipe used in potato preservation systems.

Referring to FIGS. 3A and 3B, en exemplary corrugated metal vent pipe 20 is shown, and includes a helically corrugated pipe structure 22 formed by helical winding of a corrugated metal strip 24, where opposed sides of the strip are joined (e.g., by welding or lock seam) to form a helical joint 26. The corrugated metal strip may be 16 gauge or higher material (e.g., 18-24 gauge), may have a 3"×1" corrugation configuration (as suggested in FIG. 4) and may have vent holes 28 that are sized at ¾" or less diameter (e.g., such as ⅝" or less).

However, other corrugated pipe variations are possible. The use of a material gauge of at least 18 (such as 18 or 20) may be preferred in order to achieve lighter pipe weights. In this regard, suitable pipe load strength may be achieved with such higher gages by utilizing a corrugation configuration in which corrugation depth is between about 0.700 inches and 0.750 inches, corrugation pitch is between about 1.50 inches and about 4.00 inches for pipe diameters in the range of about 15 inches to about 36 inches. In some cases larger diameters may be used (e.g., up to 48 inches). In some cases larger holes may be used (e.g., up to about 1.50 inches or up to about 2.0 inches) and in such cases the holes may be limited to the lower portion of the pipe (e.g., a portion of the pipe to rest on the ground that will have less exposure to the food items being stored).

Figure 4A:
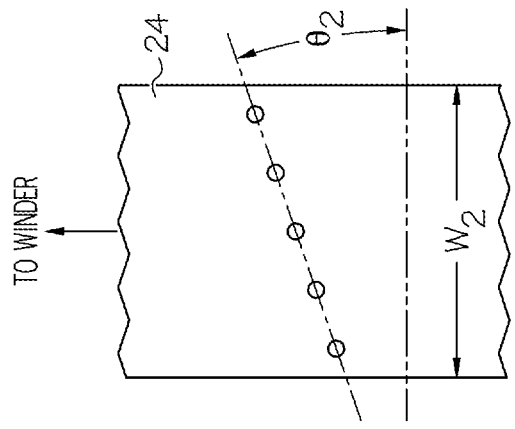
FIGS. 4A, 4B and 4C are schematic depictions of corrugated metal plate production steps.
Figure 4B:
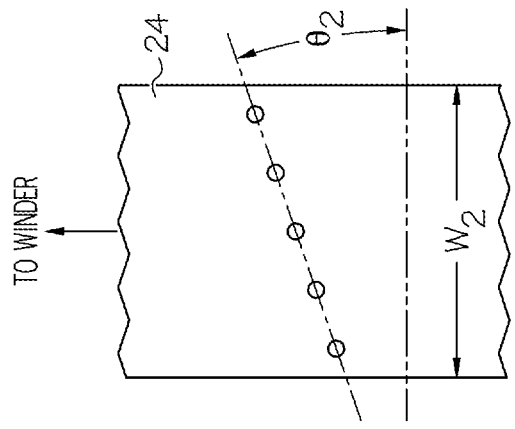
Figure 4C:
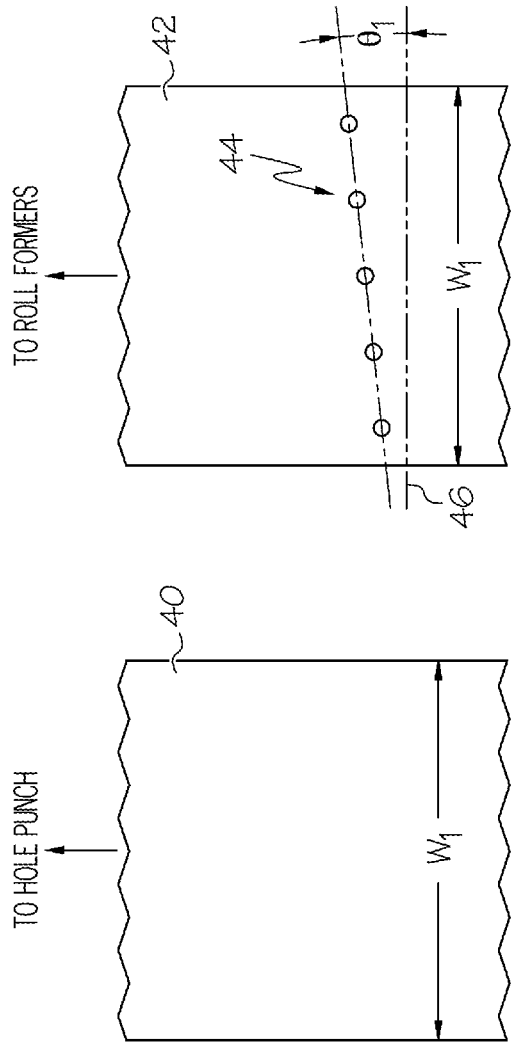

As seen in the exemplary production process schematic of FIG. 4, Step 1 reflects the flat metal strip 40 in original form, which is fed into a punch to produce a flat strip 42 with an angled hole pattern 44 shown in Step 2. The hole pattern angle θ1 (measured relative to a line 46 extending perpendicularly across the strip 42) is preselected as will be further defined below. While just one angled hole pattern is shown in the strip segment of Step 2, it is understood that the angled hole pattern will be repeated along the length of the strip. The strip 42 with hole pattern 44 is then passed through a series of roll formers to produce the corrugated metal strip 24. As shown, corrugating the strip reduces the strip width from W1 to W2, which causes a shift in the angle of the hole pattern to θ2, where θ2 is greater than θ1. By matching the helical wind angle of the corrugated metal strip 24 to the hole pattern angle θ2 of the corrugated metal strip 24, the holes will align linearly along the length of the resulting pipe as reflected in FIG. 3A.

Figure 5:
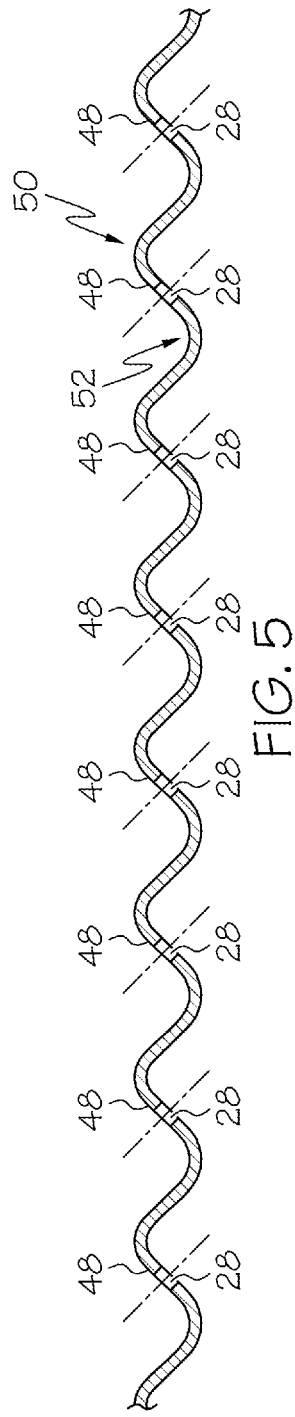
FIG. 5 is a cross-sectional depiction of the resulting corrugated metal plate taken along a plane aligned with the openings.

The corrugated metal strip 24 cross-section in FIG. 5 shows all holes located on the tangents 48 of the corrugations (i.e., in the transition from crest 50 to valley 52). In the illustrated embodiment, only one tangent of each corrugation includes a hole, but in some embodiments both tangents may include holes. Other hole locations are possible as well, such as in the valleys of the corrugations. Referring again to FIGS. 3A and 3B, in one embodiment of the pipe structure 22 multiple sets 54 of openings 28 are aligned linearly along the helically corrugated pipe structure, and the sets are circumferentially spaced apart from each other. Seven linearly extending sets of openings are shown, with the linearly extending sets uniformly spaced about the circumference of the pipe structure. However, variations in number, location, size and distribution of the holes are possible to meet end customer processing needs. As mentioned above, in some implementations the holes may be limited to the lower portion of the pipe (e.g., a portion of the pipe to rest on the ground that will have less exposure to the food items being stored). Moreover, in the case of larger size holes (e.g., over 0.75 inches) it may be desirable to create the holes after pipe formation (e.g., by cutting, burning or drilling) so as to reduce the wrinkling effect such larger holes can have during corrugation formation.

In one embodiment, the pipe structure 22 may have an inner diameter of between 15 inches and 36 inches (e.g., between 15 and 24 inches), and the pipe structure weighs no more than about twenty pounds per lineal foot (e.g., no more than 18 pounds per lineal foot).

Figure 6B:
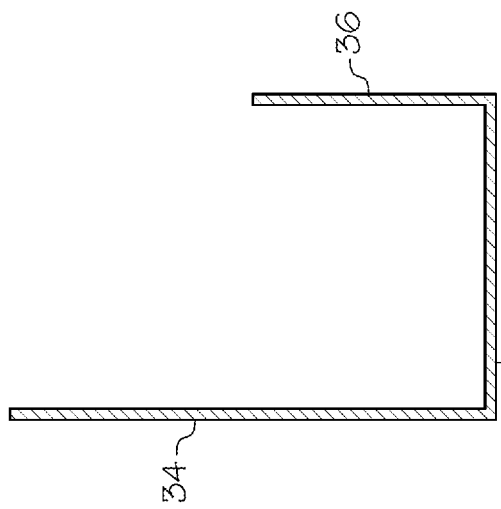
FIGS. 6A and 6B show one embodiment of an end cap.
Figure 6A:
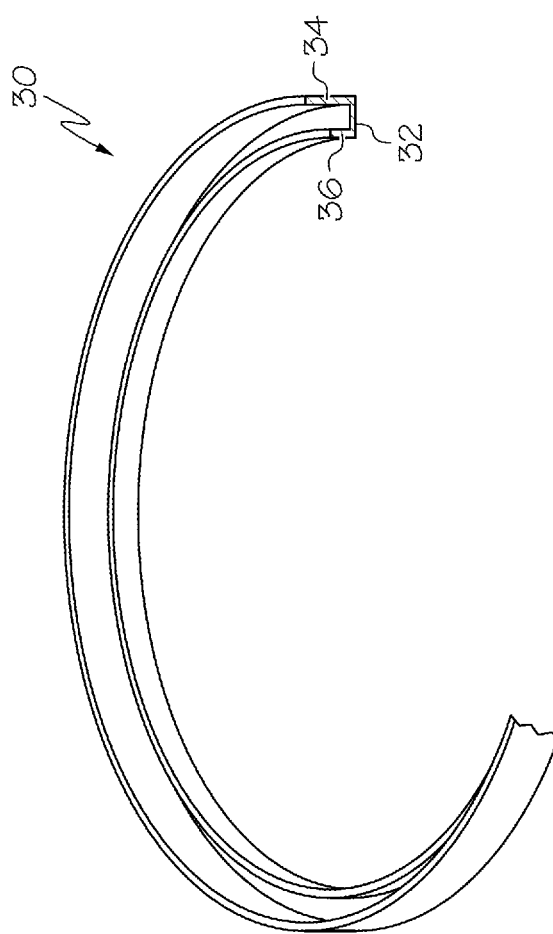

Each end of the pipe structure 22 may include a pipe end treatment in the form of an end cap structure 30 (e.g., formed of bent plate material). As seen in FIGS. 3A, 6A and 6B, each end cap has an annular end face 32, an outer ring flange 34 extending from the annular end face lengthwise along and about an exterior end portion of the pipe structure and an inner ring flange 36 extending from the end face lengthwise along and within an interior end portion of the pipe structure. The outer ring flange 34 extends a length sufficient to cover burrs on the exterior end portion of the pipe structure 22, such that the burrs cannot make their way into contact with the food items, making the pipe structure food grade. In the illustrated embodiment, inner ring flange 36 is shorter in length than the outer ring flange. The end caps may be integrally connected to the pipe ends by spot welding. However, in alternative arrangements the end caps may be removable.

Figure 8:
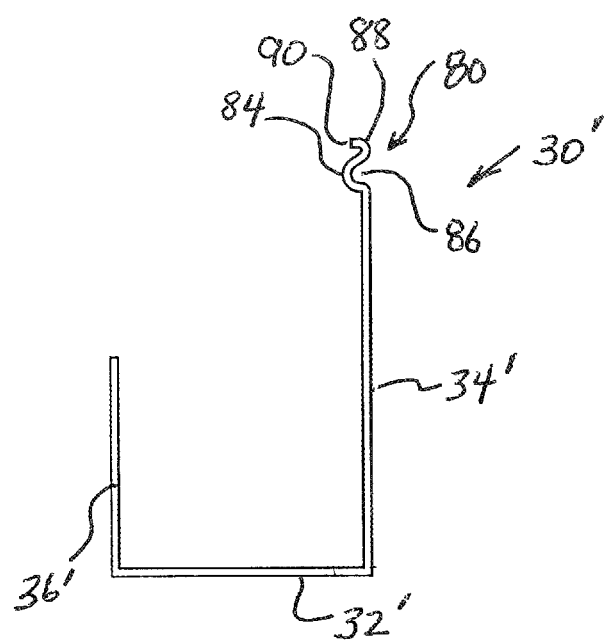
FIG. 8 is a partial cross-section of another embodiment of an end cap.

An alternative embodiment of an end cap structure 30' is shown in FIG. 8, and includes end face 32', inner ring flange 36' and outer ring flange 34'. In this embodiment, the distal end 80 of outer ring flange 34' includes a hem feature 82 with a radially inward projecting ridge 84 formed by a radius bend in the flange 34', which also creates an outer annular groove 86. A further radius bend 88 is formed in the flange so that the end face 90 of the flange material extends radially inward as well, reducing the likelihood that any food product will be exposed to the sharper edges of the end face 90. Notably, the radially inward extent of annular ridge 84 may be sized to engage with the corrugation crests of the pipe when the end cap is applied to the pipe, providing a level of friction fit gripping of the end cap 30' to the end of the pipe. In some embodiments the level of friction fit may be used to assure the end cap maintains its position before spot welding. In other embodiments the level of friction fit may be sufficient, by itself or in combination with another feature or features (such as a removable clip or clips), to achieve a secure engagement of the end cap 30' on the end of the pipe that is suitable for use of the pipe while still permitting the end cap to be removed for cleaning if desired (e.g., by overcoming the frictional engagement).

Figure 7:
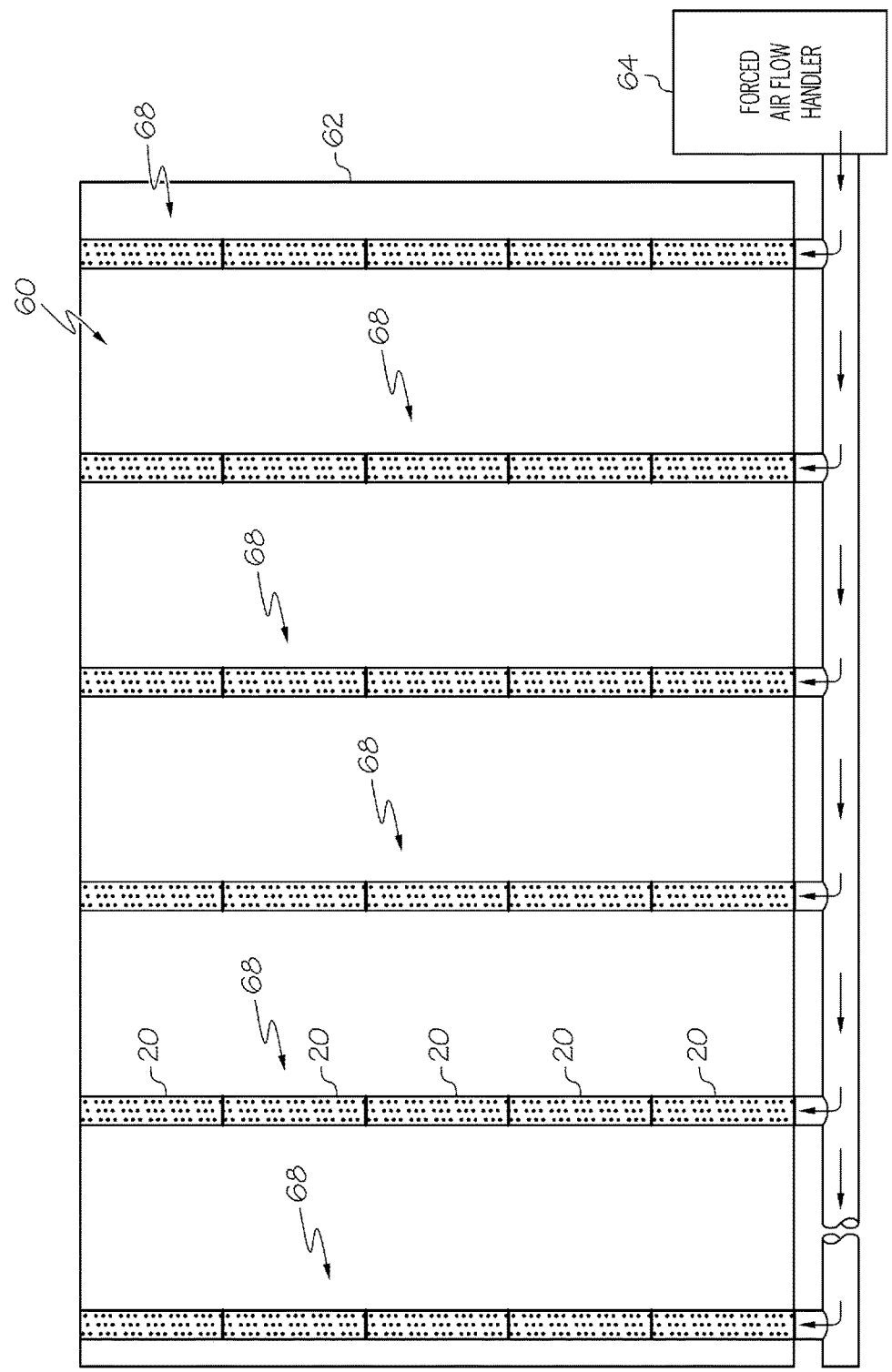
FIG. 7 shows an exemplary partial plan view of one embodiment of a potato preservation system incorporating multiple corrugated metal plate vent pipes according to the present application.

Referring to FIG. 7, an exemplary food item preservation system 60 is shown within a building 52. The system includes a forced air flow handler 64 with associated ducting 66 leading to multiple outlets that align with respective spaced apart vent pipe rows 68, each row made up of multiple corrugated metal vent pipes 20 arranged end to end. In the case of each set of end to end adjacent corrugated metal vent pipes 20, one annular end face of one of the corrugated metal vent pipes lies adjacent to one annular end face of the other corrugated metal vent pipe.

In the above system, by placing the holes on the tangent area of the corrugations, a higher gauge metal sheet can be used without the presence of the holes causing undue wrinkling during the helical wind process of the corrugated metal sheet. In addition, holes placed on the tangent will eliminate or greatly reduce the likelihood that the holes will become blocked by potatoes or impact the surface of the potatoes. A similar benefit can be achieve by placing the openings in the corrugation valleys.

Where a higher gauge material is used in combination with a deeper corrugation, the overall pipe strength/weight ratio is improved as compared to the aforementioned prior art vent pipe, resulting in a vent pipe that is both effective and more easy to handle during set-up and take-down operations. The end caps may be integrated with the vent pipes, provide a food grade end treatment the eliminates the need for grinding out the ends, and no connection structure between the pipes is needed as long as the pipe ends are positioned in close proximity to each other as they pipes are laid end to end. Removable end caps are also contemplated.

As noted above, the vent openings may be located on tangents between corrugation peaks and corrugation valleys and may be distributed about the full circumference of the pipe. The vent openings may be arranged as multiple sets of openings aligned linearly along the helically corrugated pipe structure, wherein the sets are circumferentially spaced apart from each other. At least three (e.g., five or more or seven or more) linearly extending sets of openings may be provided, and the linearly extending sets may be uniformly spaced about the circumference of the helically corrugated pipe structure.

It is to be clearly understood that the above description is intended by way of illustration and example only, is not intended to be taken by way of limitation, and that other changes and modifications are possible. For example, although the vent pipe is primarily described for use in a potato preservation system, other useful applications for the vent pipe are possible, such as beet preservation, onion preservation or preservation of any food item that may be stored in ventilated, climate controlled storage units, as well as potential non-food related uses.

What is claimed is:

1. A corrugated metal vent pipe for use in the preservation and treatment of stored food products, the vent pipe comprising:
    a helically corrugated pipe structure formed by helical winding of a corrugated metal strip, wherein the corrugated metal strip having a corrugation configuration with a corrugation pitch between about 1.50 inches and about 4.00 inches, and wherein the helically corrugated pipe structure has a diameter of between 15 inches and 36 inches and a plurality of vent openings distributed thereon;
    a first pipe end treatment on a first end of the helically corrugated pipe structure, the first pipe end treatment comprising a first end cap structure with a first annular end face, a first outer ring flange extending from the first annular end face lengthwise along and about a first exterior end portion of the helically corrugated pipe structure and a first inner ring flange extending from the first annular end face lengthwise along and within a first interior end portion of the helically corrugated pipe structure, wherein the first outer ring flange extends a length sufficient to cover burrs on the first exterior end portion of the pipe structure; and
    a second pipe end treatment on a second end of the helically corrugated pipe structure, the second pipe end treatment comprising a second end cap structure with a second annular end face, a second outer ring flange extending from the second annular end face lengthwise along and about a second exterior end portion of the helically corrugated pipe structure and a second inner ring flange extending from the second annular end face lengthwise along and within a second interior end portion of the helically corrugated pipe structure, wherein the second outer ring flange extends a length sufficient to cover burrs on the second exterior end portion of the pipe structure.

2. The corrugated metal vent pipe of claim 1 wherein the corrugated metal strip is 18 gauge or 20 gauge.

3. The corrugated metal vent pipe of claim 1 wherein the corrugated metal strip is 18 gauge or higher.

4. The corrugated metal vent pipe of claim 1 wherein the helically corrugated pipe structure has a diameter of between 15 inches and 30 inches.

5. The corrugated metal vent pipe of claim 1 wherein the first outer ring flange includes a distal end with a first hem feature and the second outer ring flange includes a distal end with a second hem feature.

6. The corrugated metal vent pipe of claim 1 wherein the first outer ring flange includes a distal end with a first radially inward projecting ridge that frictionally engages an outer surface of the helically corrugated pipe structure and the second outer ring flange includes a distal end with a second radially inward projecting ridge that frictionally engages the outer surface of the helically corrugated pipe structure.

7. The corrugated metal vent pipe of claim 6 wherein the first radially inward projecting ridge is formed by a first bend that also forms a first outer annular groove, and the second radially inward projecting ridge is formed by a second bend that also forms a second outer annular groove.

8. The corrugated metal vent pipe of claim 7 wherein the distal end of the first outer ring flange includes a further bend such that an end face of the first outer ring flange extends radially inward, wherein the distal end of the second outer ring flange includes a further bend such that an end face of the second outer ring flange extends radially inward.

9. A corrugated metal vent pipe, comprising:
    a helically corrugated pipe structure formed by helical winding of a corrugated metal strip, wherein the helically corrugated pipe structure has a plurality of vent openings located thereon;
    a first pipe end treatment on a first end of the helically corrugated pipe structure, the first pipe end treatment comprising a first annular end cap structure with a first outer portion that extends from the first end lengthwise along and about a first exterior end portion of the helically corrugated pipe structure a length sufficient to cover burrs on the first exterior end portion of the pipe structure; and
    a second pipe end treatment on a second end of the helically corrugated pipe structure, the second pipe end treatment comprising a second end cap structure with a second outer portion that extends from the second end lengthwise along and about a second exterior end portion of the helically corrugated pipe structure a length sufficient to cover burrs on the second exterior end portion of the pipe structure;

wherein the first outer portion includes a distal end with a first radially inward projecting ridge that frictionally engages an outer surface of the helically corrugated pipe structure and the second outer portion includes a distal end with a second radially inward projecting ridge that frictionally engages the outer surface of the helically corrugated pipe structure.

10. The vent pipe of claim 9 wherein the plurality of vent openings are arranged in multiple linear sets, each linear set extending substantially parallel with a lengthwise axis of the vent pipe.

11. The vent pipe of claim 10 wherein at least five linear sets of openings are spaced circumferentially apart from each other around the vent pipe.

12. The vent pipe of claim 9 wherein each vent opening is no more than about ¾ inches in diameter.

13. The vent pipe of claim 9 wherein the first radially inward projecting ridge is formed by a first bend that also forms a first outer annular groove, and the second radially inward projecting ridge is formed by a second bend that also forms a second outer annular groove.

14. The vent pipe of claim 13 wherein the distal end of the first outer portion includes a further bend such that an end face of the first outer portion extends radially inward, wherein the distal end of the second outer portion includes a further bend such that an end face of the second outer portion extends radially inward.

* * * * *